United States Patent [19]
Rattigan

[11] Patent Number: 5,195,488
[45] Date of Patent: Mar. 23, 1993

[54] INTERNAL COMBUSTION ENGINE WITH UNIQUE SWIRL

[76] Inventor: Jerry D. Rattigan, 10802 Miles Ave., Cleveland, Ohio 44105

[21] Appl. No.: 913,177

[22] Filed: Jul. 14, 1992

[51] Int. Cl.$^5$ .......................... F02B 31/02; F02B 77/02
[52] U.S. Cl. ...................................... 123/308; 123/306; 123/661; 123/668
[58] Field of Search ................. 123/306, 308, 661, 668

[56] References Cited

U.S. PATENT DOCUMENTS

| | | | |
|---|---|---|---|
| 2,735,416 | 2/1956 | Ferguson et al. | 123/661 |
| 2,763,254 | 9/1956 | Klug | 123/661 |
| 2,768,618 | 10/1956 | Kincaid | 123/306 |
| 3,154,061 | 10/1964 | Henry-Biabaud | 123/661 |
| 4,738,227 | 4/1988 | Kano et al. | 123/668 X |
| 4,759,323 | 7/1988 | August | 123/661 X |
| 5,127,379 | 7/1992 | Kobayashi et al. | 123/661 X |

Primary Examiner—Tony M. Argenbright
Attorney, Agent, or Firm—Harlan E. Hummer

[57] ABSTRACT

An internal combustion engine is described as having a unique angular relationship between the longitudinal axis of each piston cylinder, the center axis of any associated intake ports through which fluid enters the cylinder, and the longitudinal axis of any associated intake passageway for channeling fluid to the communicating intake port, to induce the fluid entering the cylinder to swirl about an axis which is angularly disposed to the longitudinal axis of the cylinder, rather than conventionally swirling about the longitudinal axis of the cylinder. The initial velocity of swirl is then accelerated by the principle of conservation of angular momentum to a more rapid and robust velocity during the compression stroke, thereby allowing the use of a much leaner fuel to air mixture.

16 Claims, 1 Drawing Sheet

INTERNAL COMBUSTION ENGINE WITH UNIQUE SWIRL

BACKGROUND OF THE INVENTION

The invention relates to engines, especially to the flow of fluid within the combustion chamber of an internal combustion engine. More particularly, the invention relates to the flow of fluid within the combustion chamber or cylinder of a gasoline or diesel engine.

It is well known to induce fluid, such as air or a mixture of fuel and air in an internal combustion engine, to swirl helically about the longitudinal axis of the cylinder in the direction of the piston, as the fluid enters the cylinder of a piston during the intake cycle or stroke of the piston. This is evidenced by U.S. Pat. Nos. 3,045,655; 3,154,059; 3,875,921; 3,878,825 and 4,187,823, which describe such a pattern of swirling fluid within a piston cylinder. This particular pattern of swirling fluid is especially useful in diesel engines to increase mixing of the fuel and air and the buring rate, and can be achieved, for example, by using the teachings of British patents nos. 497,498 and 1,320,230 to direct a stream of fluid into the piston cylinder tangentially of the longitudinal axis of the cylinder to induce the fluid to swirl about the longitudinal axis of the cylinder. The invention is directed to inducing in the hollow cylinders of a gasoline or diesel engine, a totally different fluid swirling action which should prove highly beneficial to the operation of the engine.

Briefly stated, the invention is in a means for causing fluid to swirl within a piston cylinder about an axis which is generally normal to the longitudinal axis of the cylinder, as distinguished from swirling about the longitudinal axis of the cylinder.

DESCRIPTION OF THE DRAWING

The following description of the invention will be better understood by having reference to the accompanying drawing, wherein.

DETAILED DESCRIPTION OF THE DRAWING

Figure 1:
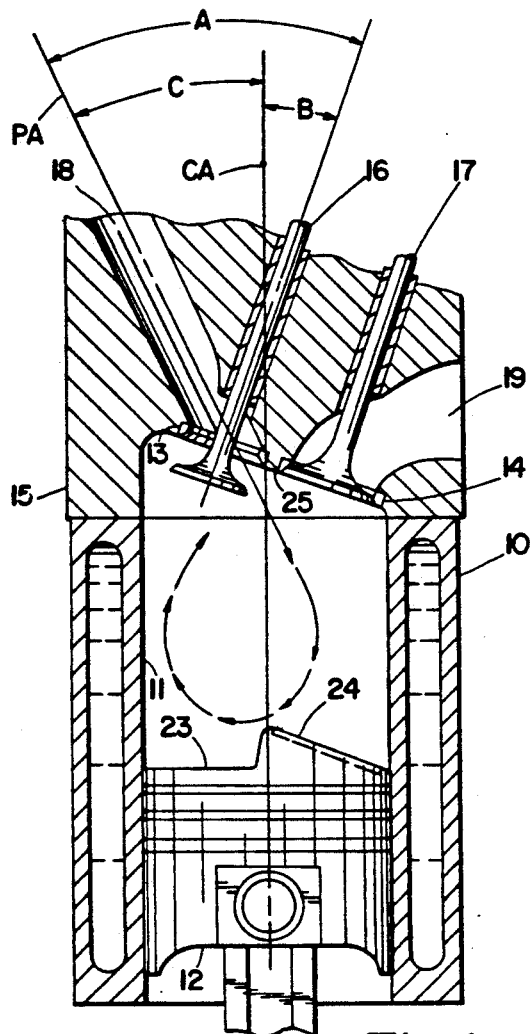
FIG. 1 is a cross-section of a piston cylinder of an internal combustion engine which is made in accordance with the invention, and shows the piston during the intake cycle or stroke of the piston.
Figure 2:
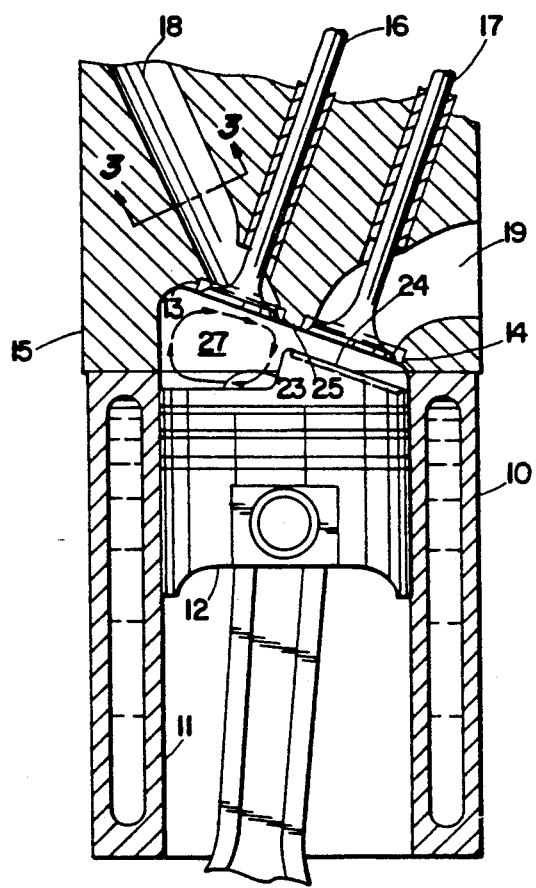
FIG. 2 is a similar section of the piston cylinder, showing the piston at about its peak during the compression cycle.

With general reference to the drawing for like parts and particular reference to FIGS. 1 and 2, there is shown, for example, a four-cycle gasoline engine 10 which comprises a typical hollow cylinder 11 in which a piston 12 is mounted for reciprocating along the longitudinal axis CA of the cylinder 11 to and from a pair of identical, circular, fluid intake ports 13 and a circular, fluid exhaust port 14, all of which ports are located in the cylinder head 15 of the engine 10. The intake ports 13 and the exhaust port 14 are conventional valve seat inserts which, in this case, are located in the same plane which is disposed at an acute angle with a plane that is normal to the longitudinal axis of the cylinder 11. The intake ports 13 are in side-by-side, spaced relation and have center axes which are equidistant from opposite sides of the longitudinal axis CA of the cylinder 11.

A conventional intake valve 16 is mounted in each of the intake ports 13 for reciprocating along the center axis of the port to simultaneously open and close the intake ports 13 in synchronized relation with the opening and closing of the exhaust port 14 by a similarly designed exhaust valve 17 which is mounted in the exhaust port 14 for reciprocating along the center axis of the exhaust port 14 to open and close the exhaust port 14, during the various cycles or strokes of the piston 12.

A separate, fluid intake passageway 18 is in communication with each one of the intake ports 13 for channeling fluid, e.g. a mixture of gasoline and air, or air in the case of a diesel engine, to the intake ports 13 for subsequent passage therefrom, when the intake ports 13 are open. A fluid exhaust passageway 19 is in communication with the exhaust port 14 for channeling exhaust gas from the cylinder 11 to the outside atmosphere via a muffler system, not shown, when the exhaust port 14 is open. If desired, a fuel injector, not shown, can be provided for spraying fuel into a stream of air flowing through each one of the fluid intake passageways 18 towards the intake ports 13.

Each one of the fluid intake passageways 18 has a longitudinal axis PA which intersects the center axis of a communicating intake port 13 at an acute angle A which is forty-five degrees plus or minus ten degrees. A plane containing the center axes of the intake ports 13, which axes coincide with the longitudinal axes of the intake valves 16, intersects the longitudinal axis of the cylinder 11 at an acute angle B of approximately twenty degrees. The longitudinal axes of the intake passageways 18 can be parallel, or slightly converge or diverge in the direction of the longitudinal axis of the cylinder 11. In any case, the longitudinal axes of the intake passageways 18 are in symmetrical relation to an imaginary axis which is midway between them and intersects the longitudinal axis of the cylinder 11 at an acute angle C which, as seen in FIG. 1, is greater than angle B, but less than angle A. Further, the longitudinal axes PA of the intake passageways 18 are coplanar and symmetrical about a center line that intersects the cylinder axis CA and forms a dihedral angle with a plane which is normal to the cylinder axis CA.

Figure 3:
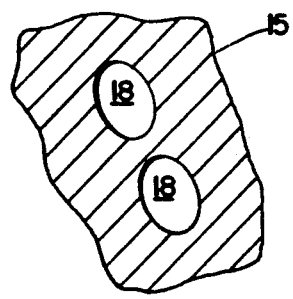
FIG. 3 is a section of a pair of fluid intake passageways viewed from the line 3—3 of FIG. 2.

The fluid intake passageways 18, as best seen in FIG. 3, each have an elliptical cross-section, as described in the aforementioned British patents. In accordance with the teaching of British patent no. 1,320,230, fluid is designed to flow from the intake passageways 18 through the open intake ports 13 in directions which are towards the longitudinal axis of the cylinder 11 and parallel to the longitudinal axes of the intake passageways 18, as shown in dotted line in FIG. 1, to induce the fluid to swirl in the cylinder 11 about an axis which is generally normal to the longitudinal axis of the cylinder 11, rather than swirling about the longitudinal axis of the cylinder 11, as is described in the aforementioned prior patents and practiced today in connection with diesel engines.

Figure 4:
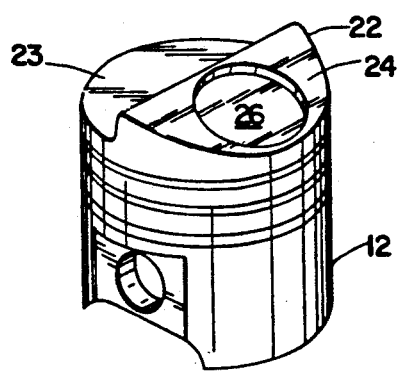
FIG. 4 is a perspective view of the piston used in the cylinder of the engine.

The piston 12 in each of the cylinders 11, as best seen in FIGS. 2 and 4, has a piston head 22 which moves into close proximity to the adjacent cylinder head 15 at the peak of the compression cycle or stroke of the piston 12. The piston head 22 is divided into two sections, the first section having an outer, flat surface 23 which is normal to the longitudinal axis of the cylinder 11, and the second section being abruptly offset from the flat surface 23 in the direction of the cylinder head 15 and having a generally flat surface 24 which declines back towards the plane of the flat surface 23 of the first section of the piston head 22 to matingly parallel the adjacent, sloped surface 25 of the intake ports 13 and exhaust port 14. A cylindrical opening 26 is recessed in the declining surface 24 of the second section of the piston head 22. The two sections of the piston head 22 form with the adjacent parti-cylindrical wall of the cylinder 11, a small chamber 27 in which compressed fluid is trapped, as the piston 12 moves towards the cylinder head 15 during the compression stroke of the piston 12 (see dotted lines in FIG. 2). Fluid is squeezed into the small chamber 27 from between the declining flat surface 24 and the matingly sloped surface 25 of the cylinder head 15, as the two surfaces 24,25, approach each other during the compression stroke of the piston 12. The size or volume of the chamber 27 can be designed to provide the desired compression ratio. The cylindrical recess 26 in the offset, second section of the piston head 22 is sized to receive the adjacent head of the exhaust valve 17 to prevent any possible interference of the exhaust valve 17 with the piston 12 as the piston 12 moves towards the cylinder head 15 during the exhaust stroke of the piston 12.

During the compression stroke, the fluid swirl is squeezed into the small chamber 27, thereby reducing the radius of swirl and decreasing the moment of inertia of the fluid swirl to increase the angular velocity of the swirl in accordance with the principle of conservation of angular momentum which is currently used to accelerate swirl about the cylinder axis in bowl-in-piston type diesel engines. A rapid velocity of the fluid produces better mixing of fuel and air, and allows the use of a much leaner air/fuel ratio, and results in a more rapid buring rate. The unique swirl of fluid within the small chamber 27 is clearly shown in dotted line in FIG. 2.

It may be desirous to use a single intake port 13 and communicating intake passageway 18 in certain small engines. In such cases, at least the longitudinal axis of the intake passageway 18, the center axis of the intake port 13, and the longitudinal axis of the cylinder 11 should be in the same plane, so that fluid will move towards the longitudinal axis of the cylinder 11, as it exits the intake port 13, to induce the fluid to swirl within the cylinder 11 about an axis which is angularly disposed to the longitudinal axis of the cylinder 11, providing the necessary angular relationships exist between the aforementioned important components coacting in the cylinder 11. For best results, the center axis of the exhaust port 14 should also be coplanar with the above mentioned axes of the cylinder 11, intake port 13, and intake passageway 18.

The swirl ratio, i.e. the angular velocity of the swirl at the final stage of compression relative to the angular velocity of the rotating crankshaft to which the pistons of an engine are operatively coupled, is normally between 6 and 7, for diesel engines, since any swirl ratio above this produces a heat transfer problem which offsets the gain in fuel efficiency of the engine. It is possible to achieve a swirl ratio which is at least two to three times this normal operating swirl ratio of about 6 or 7, when applicant's unique fluid swirling pattern is used. This is highly beneficial, because leaner fuel mixtures can be used with higher swirl ratios, thereby economizing on the use of fuel. With the use of higher swirl ratios, it is important to provide surfaces of the piston 12, cylinder 11 and valves 16,17, exposed to the hot fluid swirling within the cylinder 11, with a suitable heat resistant material, such as a high heat resistant ceramic or graphic containing material to prevent or substantially reduce the transfer of heat from the high temperature fluid within the cylinder 11 to the adjacent piston, cylinder and valves. Moreover, any engaging surfaces between the moving piston 12 and adjacent cylindrical wall of the cylinder 11, should be provided with a wear resistant material in addition to the heat resistant material. The aforementioned materials can be used, providing the material selected has good wear and heat resistant characteristics.

Thus, there has been described a unique location, angular disposition, and combination of the fluid intake passageways and associated fluid intake valves in relation to each other and the longitudinal axis of the piston cylinder, to induce fluid, directed into the cylinder from the intake ports, to swirl within the cylinder about an axis which is angularly disposed to the longitudinal axis of the cylinder, contrary to any known prior art patents which teach conventional swirling of the fluid within the cylinder about the longitudinal axis of the cylinder. Moreover, there is described a way to use leaner fuel and air mixtures by the provision in the cylinder area of high heat and wear resistant surfaces to eliminate or reduce to a minimal level the transfer of heat from the hot fluid which develops when high swirl ratios are achieved.

What is claimed is:

1. An engine, comprising:
    a) at least one hollow cylinder having a longitudinal axis;
    b) a piston mounted in the cylinder for reciprocating along the longitudinal axis thereof;
    c) at least one circular, intake port communicating with the cylinder, the piston reciprocating to and from the intake port which has a center axis which intersects the longitudinal axis of the cylinder in angular relation;
    d) an intake valve mounted in the intake port for reciprocating along the center axis thereof to open and close the intake port in synchronized relation with movement of the piston in the cylinder; and
    e) means coacting with the intake port for directing fluid through the intake port, when open, into the cylinder, such that at least a portion of the fluid swirls within the cylinder about an axis which is angularly disposed to the longitudinal axis of the cylinder, rather than swirling about the longitudinal axis of the cylinder, said means including a straight intake passageway extending from the at least one intake port in angular relation to the center axis of said intake port, such that the included angle (A) between the longitudinal axis of the straight intake passageway and the center axis of the intake port, is in the range of from 35 to 55 degrees, so that fluid flows from the intake passageway through the intake port towards the piston and towards and beyond the longitudinal axis of the cylinder.

2. The engine of claim 1, wherein the piston mounted in the at least one cylinder includes:
    f) a piston head which is divided into two adjacent sections, the first of the two sections having a flat surface which is normal to the longitudinal axis of the piston, and the second of the two sections being abruptly offset from the flat surface of the first section towards the adjacent cylinder head, the second section having a flat surface which declines in directions away from the cylinder head and flat surface of the first section of the piston head to parallel an adjacent matingly sloped surface of the cylinder head, the declining surface of the second section having recessed therein a cylindrical opening which is designed to receive an adjacent head of an exhaust valve to prevent interference between the exhaust valve and piston head, as the piston moves towards the cylinder head during the exhaust cycle.

3. An engine, comprising:
a) at least one hollow cylinder having a longitudinal axis;
b) a piston mounted in the cylinder for reciprocating along the longitudinal axis thereof;
c) at least one circular, intake port communicating with the cylinder, the piston reciprocating to and from the intake port which has a center axis which intersects the longitudinal axis of the cylinder in angular relation;
d) an intake valve mounted in the intake port for reciprocating along the center axis thereof to open and close the intake port in synchronized relation with movement of the piston in the cylinder; and
g) means coacting with the intake port for directing fluid through the intake port, when open, into the cylinder, such that at least a portion of the fluid swirls within the cylinder about an axis which is angularly disposed to the longitudinal axis of the cylinder, rather than swirling about the longitudinal axis of the cylinder, said means including; an intake passageway which is in communication with the intake port, the intake passageway having an elliptical cross-section adjacent the intake port and a longitudinal axis which intersects the center axis of the intake port at an acute angle (A) which is in the range of from 35 to 55 degrees, at least a portion of the fluid exiting the open intake port in parallel relation with the longitudinal axis of the intake passageway, and the center axis of the intake port is oriented to the longitudinal axis of the cylinder at an acute angle (B) which is less than the acute angle (A) between the center axis of the intake port and the longitudinal axis of the intake passageway.

4. The engine of claim 3, which includes a plurality of similarly sized intake ports which are equidistant from the longitudinal axis of the cylinder and a separate intake passageway communicating with each of the plurality of intake ports to channel fluid to the intake ports, the plurality of intake passageways having longitudinal axes which are coplanar and symmetrical about a center line that intersects the longitudinal axis of the cylinder and forms a dihedral angle with a plane normal to the longitudinal axis of the cylinder.

5. The engine of claim 4, wherein the piston includes a piston head which is divided into two adjacent sections, the first of the two sections having a generally flat surface which is normal to the longitudinal axis of the piston, and the second of the two sections being abruptly offset from the flat surface of the first section towards the adjacent cylinder head, the section having a generally flat surface which declines in a direction away from the cylinder head and abrupt offset of the second section to parallel an adjacent sloped surface of the cylinder head, the declining surface of the second section having recessed therein a cylindrical opening which is designed to receive an adjacent head of an exhaust valve to prevent interference between the exhaust valve and piston head, as the piston moves towards the cylinder head during the exhaust cycle of the engine.

6. The engine of claim 5, wherein the acute angle (A) between the center axis of each of the intake ports and the longitudinal axis of an associated intake passageway is 45 degrees.

7. The engine of claim 6, wherein the fluid is selected from the group consisting of air and a mixture of air and fuel.

8. The engine of claim 7, wherein the swirl ratio of the angular velocity of the fluid swirl to the angular velocity of the crankshaft of the engine is at least 10.

9. The engine of claim 8, wherein at least the piston head, cylinder head and valve faces confronting the piston, are covered with a heat resistant material.

10. An internal combustion engine including intake, compression, firing and exhaust cycles, comprising:
a) a plurality of elongated hollow cylinders, each of which has a longitudinal axis and a cylinder head for enclosing the cylinder from the ambient atmosphere;
b) a piston mounted in each of the cylinders for reciprocating along the longitudinal axis thereof to and from the cylinder head;
c) a plurality of circular, fluid intake ports disposed in the cylinder head of each of the plurality of cylinders in communication with the adjacent cylinder, the intake ports of each cylinder being equidistant from the longitudinal axis of the cylinder;
d) at least one circular, exhaust port disposed in the cylinder head of each of the cylinders in communication with the adjacent cylinder;
e) an intake valve mounted in each of the intake ports for reciprocating along the center axis thereof to open and close the intake port, the intake valves of each cylinder reciprocating simultaneously;
f) an exhaust valve mounted in the at least one exhaust port of each cylinder for reciprocating along the center axis thereof to open and close the exhaust port in synchronized relation with the opening and closing of the adjacent intake ports;
g) a separate, straight fluid intake passageway extending from, and communicating with, each of the intake ports of each cylinder for directing streams of fluid simultaneously through the intake ports of the cylinder towards the piston and towards and beyond the longitudinal axis of the cylinder, when the intake ports of the cylinder are open during the intake cycle, the straight intake passageways extending from the intake ports of each cylinder having longitudinal axes, each of which axes is angularly disposed to the center axis of the communicating intake port, such that the included angle (A) between the longitudinal axis of each said intake passageway and center axis of each said intake port is in the range of from 35 to 55 degrees, the angular relationship between the intake passageways and a communicating intake port being designed such that fluid exits the intake ports of each cylinder in directions which generally parallel the longitudinal axes of the intake passageways;
h) an exhaust passageway communicating with the at least one exhaust port of each cylinder for carrying exhaust fluid from the cylinder during the exhaust cycle when the exhaust port is open;

the above angular relationships between the longitudinal axis of each of the cylinders, the center axes of associated intake ports, and the longitudinal axes of associated straight intake passageways leading from the intake ports being such as to induce fluid, entering the cylinder, to swirl about an axis which is angularly disposed to the longitudinal axis of the cylinder as distinguished from swirling about the longitudinal axis of the cylinder.

11. The engine of claim 10, wherein the plurality of intake passageways associated with each cylinder, having a plurality of longitudinal axes which are coplanar and symmetrical about a center line that intersects the longitudinal axis of the cylinder and forms a diherdral angle with a plane normal to the longitudinal axis of the cylinder.

12. An internal combustion engine including intake, compression, firing and exhaust cycles, comprising:
 a) a plurality of elongated hollow cylinders, each of which has a longitudinal axis and a cylinder head for enclosing the cylinder from the ambient atmosphere;
 b) a piston mounted in each of the cylinders for reciprocating along the longitudinal axis thereof to and from an adjacent cylinder head;
 c) a plurality of circular, fluid intake ports disposed in the cylinder head of each of the plurality of cylinders in communication with the adjacent cylinder, the intake ports of each cylinder being equidistant from the longitudinal axis of the cylinder;
 d) at least one circular, exhaust port disposed in the cylinder head of each of the cylinders in communication with the adjacent cylinder;
 e) an intake valve mounted in each of the intake ports for reciprocating along the center axis thereof to open and close the intake port, the intake valves of each cylinder reciprocating simultaneously;
 f) an exhaust valve mounted in the exhaust port of each cylinder for reciprocating along the center axis thereof to open and close the exhaust port in synchronized relation with the opening and closing of the adjacent intake ports;
 g) a separate fluid intake passageway communicating with each of the intake ports of each cylinder for directing streams of fluid simultaneously through the intake ports of the cylinder in the direction of the longitudinal axis of the cylinder, when the intake ports of the cylinder are open during the intake cycle, the intake passageways of each cylinder having longitudinal axes, each of which are angularly disposed to the center axis of a communicating intake ports at an acute angle (A) in the range of from 35 to 55 degrees, the angular relationship between the intake passageways and a communicating intake port being designed such that fluid exits the intake ports of each cylinder in directions which generally parallel the longitudinal axes of the intake passageways;
 h) an exhaust passageway communicating with the at least one exhaust port of each cylinder for carrying exhaust fluid from the cylinder during the exhaust cycle when the exhaust port is open;
 the above angular relationships between the longitudinal axis of each of the cylinders, the center axes of associated intake ports, and the longitudinal axes of associated intake passageways being such as to induce fluid, entering the cylinder, to swirl about an axis which is angularly disposed to the longitudinal axis of the cylinder as distinguished from swirling about the longitudinal axis of the cylinder;
 the plurality of intake passageways associated with each cylinder having a plurality of longitudinal axes which are coplanar and symmetrical about a center line that intersects the longitudinal axis of the cylinder and forms a dihedral angle with a plane normal to the longitudinal axis of the cylinder; and each of the pistons includes:
 i) a piston head which is divided into two adjacent sections, the first of the two sections having a flat surface which is normal to the longitudinal axis of the piston, and the second of the two sections being abruptly offset from the flat surface of the first section towards the adjacent cylinder head, the second section having a flat surface which declines in directions away from the cylinder head and flat surface of the first section of the piston head to parallel an adjacent matingly sloped surface of the cylinder head, the declining surface of the second section having recessed therein a cylindrical opening which is designed to receive an adjacent head of an exhaust valve to prevent interference between the exhaust valve and piston head, as the piston moves towards the cylinder head during the exhaust cycle.

13. The engine of claim 12, wherein the acute angle (A) is 45 degrees.

14. The engine of claim 12, which includes a swirl ratio of at least ten, and surfaces of the piston, cylinder, cylinder head and valves exposed to fluid within each cylinder, include a heat resistant material sufficient to substantially reduce the transfer of heat from the fluid to the exposed surfaces of the piston, cylinder, cylinder head and valves.

15. The engine of claim 14, wherein the heat resistant material is selected of the group consisting of ceramics and graphite.

16. The engine of claim 15, wherein each piston has an outer cylindrical wall which engages an adjacent cylindrical wall of a cylinder, and the engaging walls include hard wearing abutting surfaces which are coated with a wear and heat resistant material.

* * * * *